(12) United States Patent
Liebert

(10) Patent No.: US 12,084,042 B2
(45) Date of Patent: Sep. 10, 2024

(54) MOTOR VEHICLE HAVING AT LEAST TWO DRIVE MOTORS AND HAVING AN AUTOMATIC TRANSMISSION WHICH HAS A FIXED AND A POWER SPLIT GEAR RATIO

(71) Applicant: Bayerische Motoren Werke Aktiengesellschaft, Munich (DE)

(72) Inventor: Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 18 days.

(21) Appl. No.: 18/015,418

(22) PCT Filed: Aug. 6, 2021

(86) PCT No.: PCT/EP2021/071963
§ 371 (c)(1),
(2) Date: Jan. 10, 2023

(87) PCT Pub. No.: WO2022/048858
PCT Pub. Date: Mar. 10, 2022

(65) Prior Publication Data
US 2023/0286491 A1     Sep. 14, 2023

(30) Foreign Application Priority Data

Sep. 1, 2020  (DE) .................. 10 2020 122 845.7

(51) Int. Cl.
*F16H 61/04*       (2006.01)
*B60K 6/365*       (2007.10)
(Continued)

(52) U.S. Cl.
CPC ............. *B60W 20/30* (2013.01); *B60K 6/365* (2013.01); *B60K 6/543* (2013.01); *B60L 15/20* (2013.01);
(Continued)

(58) Field of Classification Search
CPC ....... B60K 6/365; B60K 6/543; B60W 20/30; B60W 10/04; B60W 2510/1005; B60W 2710/0644; F16H 3/728; F16H 61/04
See application file for complete search history.

(56) References Cited

U.S. PATENT DOCUMENTS

| 8,308,593 B2 * | 11/2012 | Kumazaki | .............. | B60K 6/445 |
|---|---|---|---|---|
| | | | | 475/5 |
| 9,340,098 B2 * | 5/2016 | Choi | ...................... | B60K 6/445 |

(Continued)

FOREIGN PATENT DOCUMENTS

| DE | 10 2011 085 149 A1 | 4/2013 |
|---|---|---|
| DE | 10 2014 016 188 A1 | 5/2016 |

(Continued)

OTHER PUBLICATIONS

International Search Report (PCT/ISA/210) issued in PCT Application No. PCT/EP2021/071963 dated Oct. 27, 2021 with English translation (five (5) pages).

(Continued)

*Primary Examiner* — Derek D Knight
(74) *Attorney, Agent, or Firm* — Crowell & Moring LLP

(57) ABSTRACT

A motor vehicle has at least two drive motors, at least one of which is an electric motor, a high-voltage accumulator, and an automatic transmission which has at least one fixed gear ratio and at least one power-split gear ratio for transmission ratio adjustment starting from the at least one fixed gear ratio. The motor vehicle includes an electronic control unit having a speed control module which can be activated during a change of transmission ratio. The speed control module is designed in such a way that a setpoint speed is calculated in advance, by which setpoint speed both the speed gradient and also the speed curvature can be limited, the target speed of the at least one drive motor being (Continued)

continuously compared with a maximum allowed speed gradient and with a maximum allowed speed curvature.

7 Claims, 15 Drawing Sheets

(51) Int. Cl.
    *B60K 6/543*         (2007.10)
    *B60L 15/20*        (2006.01)
    *B60W 10/04*       (2006.01)
    *B60W 10/101*      (2012.01)
    *B60W 20/30*       (2016.01)
    *F16H 3/72*         (2006.01)
    *F16H 59/36*        (2006.01)

(52) U.S. Cl.
    CPC .......... *B60W 10/04* (2013.01); *B60W 10/101* (2013.01); *F16H 3/728* (2013.01); *F16H 61/04* (2013.01); *B60W 2510/1005* (2013.01); *B60W 2710/0644* (2013.01); *B60W 2710/0661* (2013.01); *B60W 2710/081* (2013.01); *B60W 2710/082* (2013.01); *B60W 2710/1005* (2013.01); *B60Y 2200/92* (2013.01); *F16H 2059/363* (2013.01); *F16H 2059/366* (2013.01)

(56) References Cited

U.S. PATENT DOCUMENTS

| 11,878,676 B2 * | 1/2024 | Liebert .................. B60K 6/445 |
| 2020/0217399 A1 | 7/2020 | Kluge et al. |
| 2023/0242093 A1 * | 8/2023 | Liebert ................ B60W 20/30 |
| | | 477/34 |

FOREIGN PATENT DOCUMENTS

| DE | 10 2017 217 133 A1 | 3/2019 |
| WO | WO 2010/109162 A2 | 9/2010 |

OTHER PUBLICATIONS

German-language Written Opinion (PCT/ISA/237) issued in PCT Application No. PCT/EP2021/071963 dated Oct. 27, 2021 (10 pages).

German-language Search Report issued in German Application No. 10 2020 122 845.7 dated Jan. 22, 2021 with partial English translation (11 pages).

* cited by examiner

MOTOR VEHICLE HAVING AT LEAST TWO DRIVE MOTORS AND HAVING AN AUTOMATIC TRANSMISSION WHICH HAS A FIXED AND A POWER SPLIT GEAR RATIO

BACKGROUND AND SUMMARY

The invention relates to a motor vehicle comprising at least two drive motors, wherein at least one drive motor is an electric motor, comprising a high-voltage accumulator, comprising an automatic transmission which has at least one fixed gear ratio and at least one power-split gear ratio for gear ratio adjustment starting from the at least one fixed gear ratio, and comprising an electronic control unit.

Automatic transmissions for motor vehicles are known. Automatic transmissions for hybrid electric vehicles are also known which, in addition to an internal combustion engine, also have at least one electric motor for the drive. Current automatic transmissions for hybrid electric vehicles (hybrid transmissions) are usually based on existing automatic transmissions. The electric motor for electrification is usually positioned between the internal combustion engine and the transmission (so-called P2 hybrid). However, this type of hybridization does not bring any advantages for the transmission per se.

Transmissions suitable for hybridization are, for example, powershift automatic transmissions that provide the various fixed gear ratios via frictionally engaged shift elements. In these transmissions, at least one shift element is operated under slip during gear changes. The friction work during slip operation is converted here into heat, which must be dissipated from the frictionally engaged shift elements via a sufficient cooling oil flow. Furthermore, the frictionally engaged shift elements generate corresponding drag losses in the open state. The shift elements are generally hydraulically actuated. To enable them to transmit power in the closed state, the friction plates of the shift elements must be permanently pressed against each other with a correspondingly high hydraulic pressure. The hydraulic pump required for this is used both for cooling and for actuating the shift elements. However, it requires a certain amount of power to operate, which reduces the overall efficiency.

According to the subject matter of DE 10 2017 217 133 A1, an automatic transmission comprising an internal combustion engine, comprising at least two fixed gear ratios, comprising three transmission shafts, comprising an epicyclic gearbox, comprising two shift elements and comprising a variator is provided. In this case, a first side of the variator can be coupled to a first transmission shaft in a torque-transmitting manner and a second side of the variator can be coupled to the epicyclic gearbox via a second transmission shaft in a gear-ratio-adjusting manner. This means that the second side of the variator is in a 3-shaft operation together with the internal combustion engine and an output of the automatic transmission, whereby the second side of the variator has a gear-ratio-adjusting effect on the internal combustion engine via the epicyclic gearbox. The variator enables continuous gear ratio adjustment here. Thus, further gear ratios can be set independently of the fixed gear ratios, in particular any intermediate states between the fixed gear ratios. Preferably, the variator is formed by two electric motors. In this case, one of the electric motors is operated as a generator and the other electric motor as a motor. By temporarily converting mechanical energy into electrical energy, the speeds of the two electric motors can be decoupled, thus providing variator functionality with the two electric motors. The epicyclic gearbox can be a planetary gearbox.

The object of the invention is to improve a hybrid motor vehicle comprising an automatic transmission of the type described at the outset with regard to its gear ratio adjustment.

This object is achieved by the features of the independent claims. Advantageous developments are the subject of the dependent claims.

The invention relates to a motor vehicle comprising at least two drive motors, wherein at least one drive motor is an electric motor, comprising a high-voltage accumulator and comprising an automatic transmission which has at least one fixed gear ratio (fixed gear) and at least one power-split gear ratio (E-CVT) for gear ratio adjustment starting from the at least one fixed gear ratio. For example, leaving a single fixed gear in the power-split gear ratio (E-CVT) is also relevant In particular, the invention relates to a motor vehicle comprising an internal combustion engine, comprising at least one electric motor, and comprising an automatic transmission having at least two fixed gear ratios and a variator for gear ratio adjustment between the two fixed gear ratios, wherein the variator comprises, for example, two electric motors. One electric motor may also suffice. In this case, the variator consists of the electric motor and a high-voltage accumulator.

The motor vehicle according to the invention further comprises an electronic control unit with a speed control module which can be activated during a gear change. The speed control module is designed in such a way that a setpoint speed is calculated in advance, by means of which both the speed gradient and also the speed curvature can be limited, wherein the target speed of the at least one drive motor is continuously compared with a maximum allowed speed gradient and with a maximum allowed speed curvature.

For example, the invention has a variator formed by two electric motors. During the gear ratio changes, a first electric motor is operated as a generator and a second electric motor is operated as a motor. However, the first electric motor may also be motor-driven prior to a gear ratio adjustment.

Preferably, the shift elements are interlocking shift elements (e.g. claws). This has the advantage that the shift elements can be held or secured in the closed position with little force. As a result, the energy consumption for maintaining the fixed gear ratios can be reduced, thus increasing the overall efficiency. In addition, there are (virtually) no drag losses in the open state of interlocking shift elements.

According to a further advantageous embodiment of the invention, the first shift element is provided for engaging the first fixed gear ratio and the second shift element is provided for engaging the second fixed gear ratio. This means that each fixed gear ratio is assigned a preferably separate shift element by means of which the gear ratio is engaged and, in particular, held closed. Alternatively, a plurality of shift elements for engaging a fixed gear ratio and/or individual shift elements for engaging a plurality of fixed gear ratios can also be provided.

In this way, the variator can be used to shift between two fixed gear ratios by continuous gear ratio adjustment (E-CVT) whilst simultaneously maintaining the tractive force. Power flows here via the variator only during shifting between the fixed gear ratios, which is usually less efficient than purely mechanical power transmission. In particular, no power flows via the variator when the fixed gear ratio is engaged. As the corresponding shift elements provide the power transmission of the fixed gear ratios, the automatic transmission can thus have a high efficiency.

In the shifting method according to the invention, the first electric motor of the variator can be at least temporarily coupled to the transmission shaft in a torque-transmitting manner in order to inject or withdraw torque into/from the transmission.

Furthermore, the second electric motor of the variator can be coupled at least temporarily via the shaft to the planetary gearbox in a gear-ratio-adjusting manner. This means that the second side of the variator has a gear-ratio-adjusting effect on the internal combustion engine via the epicyclic gearbox, in particular in that the second side of the variator is in a 3-shaft operation together with the internal combustion engine and an output of the automatic transmission.

In principle, reference is also made to DE 10 2017 217 133 A1 for an explanation of the conceptual transmission design.

Essential to the invention according to the present application is therefore a speed control module which is designed in such a way that a setpoint speed is calculated in advance, by means of which both the speed gradient and also the speed curvature can be limited, wherein the target speed of the at least one drive motor is continuously compared with a maximum allowed speed gradient and with a maximum allowed speed curvature.

The invention is based on the following considerations:

In contrast to conventional speed control tasks of drive motors, in power-split operation, i.e. in a motor vehicle comprising at least two drive motors, wherein at least one drive motor is an electric motor, and comprising an automatic transmission that has at least one fixed gear ratio and at least one power-split gear ratio for ratio adjustment, the transmission output torque of the two drive motors, in particular one/the internal combustion engine and one/the electric motor, must also be set in accordance with the driver's request (e.g. transmitted by the accelerator pedal position) in parallel with the speed control task.

In addition, there is the use of interlocking shift elements, which allows only very small speed windows in order to engage a fixed gear (i.e., a fixed gear ratio) from a power-split gear (i.e., a power-split gear ratio) without damage and imperceptibly for the driver.

In the prior art, frictionally engaged or combined frictionally engaged shift elements have been used up to now, which can be used to support synchronization of the desired gear even at higher differential speeds. This is achieved by means of low friction torques which are imperceptible to the driver but have a stabilizing effect on the speed control task.

For the use of interlocking shift elements, the speed control task in power-split operation must therefore be handled exclusively by the internal combustion engine and electric motor. The internal combustion engine has the decisive disadvantage compared to the electric motor that it can adjust its torque with strongly varying torque gradients depending on its possible operating points. However, the maximum settable torque gradient is decisive for the dynamics of the speed control task, i.e., for the adjustment duration of the speed of the internal combustion engine between two gear ratios of the gearbox.

In order to be able to use the full dynamics of the electric motor and internal combustion engine during speed control in power-split operation, it is therefore necessary to calculate in advance the desired speed curve (setpoint speed) of the internal combustion engine and electric motor over time. A classic speed gradient limitation is not sufficient for this, since the internal combustion engine and electric motor cannot change their torque abruptly.

A setpoint speed pre-calculation is therefore proposed which is capable of limiting both the speed gradient and its derivative (speed curvature). For this purpose, this pre-calculation must continuously consider the actual target speed of the internal combustion engine or of the electric motor and determine the setpoint speeds for the next time step on the basis of the maximum permissible speed gradient and maximum permissible speed curvature.

A conventional two-stage limitation of speed gradient and speed curvature leads to overshooting, which must be avoided for reasons of speed control. Therefore, it is proposed to extend the two-stage limitation of speed gradient and speed curvature by a braking function. For this purpose, it is continuously determined how much speed gradient is still allowed in order to hit the target speed curve exactly tangentially with the currently allowed speed curvature (corresponds to torque gradient) and at the currently available rate of change of the target speed. This means that the speed gradient can be continuously reduced as the target speed is approached, thus maintaining the allowed torque gradient of the internal combustion engine and of the electric motor. Overshooting of the new reference variable (=setpoint speeds for the internal combustion engine and electric motor) is thus avoided and the speed control can exploit the full dynamics of the drive system.

Using the new reference variable and its $1^{st}$ and $2^{nd}$ order time derivatives, it is now possible to build a speed controller with very precise feedforward control, which operates the controlled system very well even without controller intervention. This property allows operation with comparably large dead times in the control loop and thus, for example, control of the internal combustion engine and electric motor via a vehicle bus such as CAN or Flexray. The actual speed controller "only" corrects the error between the controlled system and the feedforward control and is thus able to control the differential speeds required for positive shift elements.

DHT (Dedicated Hybrid Transmission) is currently the most common hybrid transmission, used only in vehicles with an internal combustion engine and at least one electric motor. The electric motor (here the first electric motor of the variator) becomes part of the transmission, wherein it can be connected to different transmission shafts.

The use of interlocking shift elements for gear formation and power transmission in DHT drives offers the opportunity of maximum efficiency in power transmission and minimum power requirements due to demand-oriented actuation. At the same time, however, interlocking shift elements also present challenges. In conventional manual transmissions or similar automated systems, power transmission is completely interrupted before the interlocking shift elements are actuated. This freedom from load allows interlocking shift elements to be opened or designed without any repercussion for the drive and with comparatively little effort.

DETAILED DESCRIPTION OF THE DRAWINGS

Figure 1:
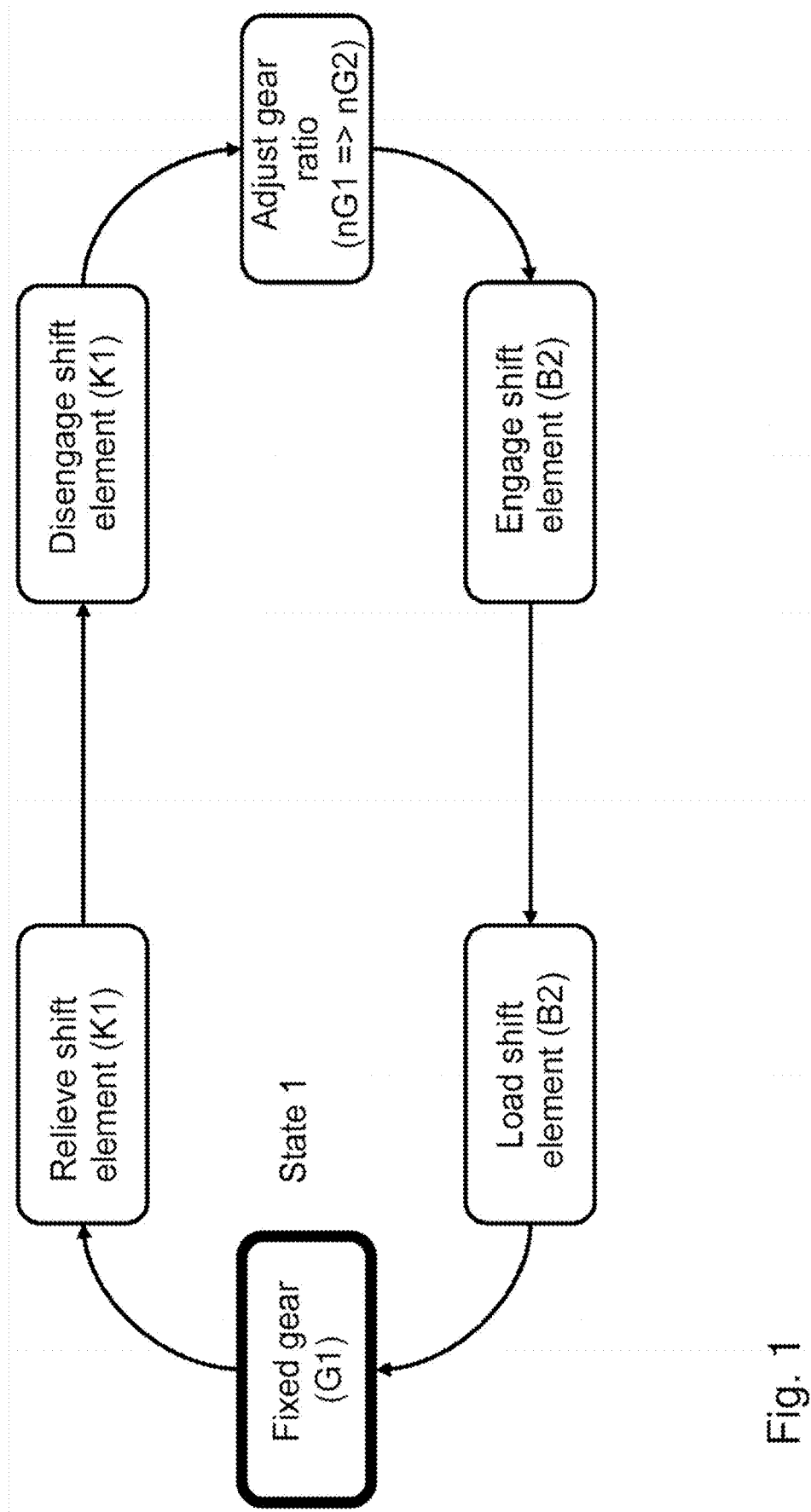
FIG. 1 shows state 1 of the entire shift sequence during a gear change with the automatic transmission according to the invention from a first fixed gear to a second fixed gear.

FIG. 1 shows the initial state, state 1, with the first gear engaged (fixed gear G1) before a gear change command. This is followed by a gear change command in an electronic control unit SG by a corresponding input signal.

Figure 2:
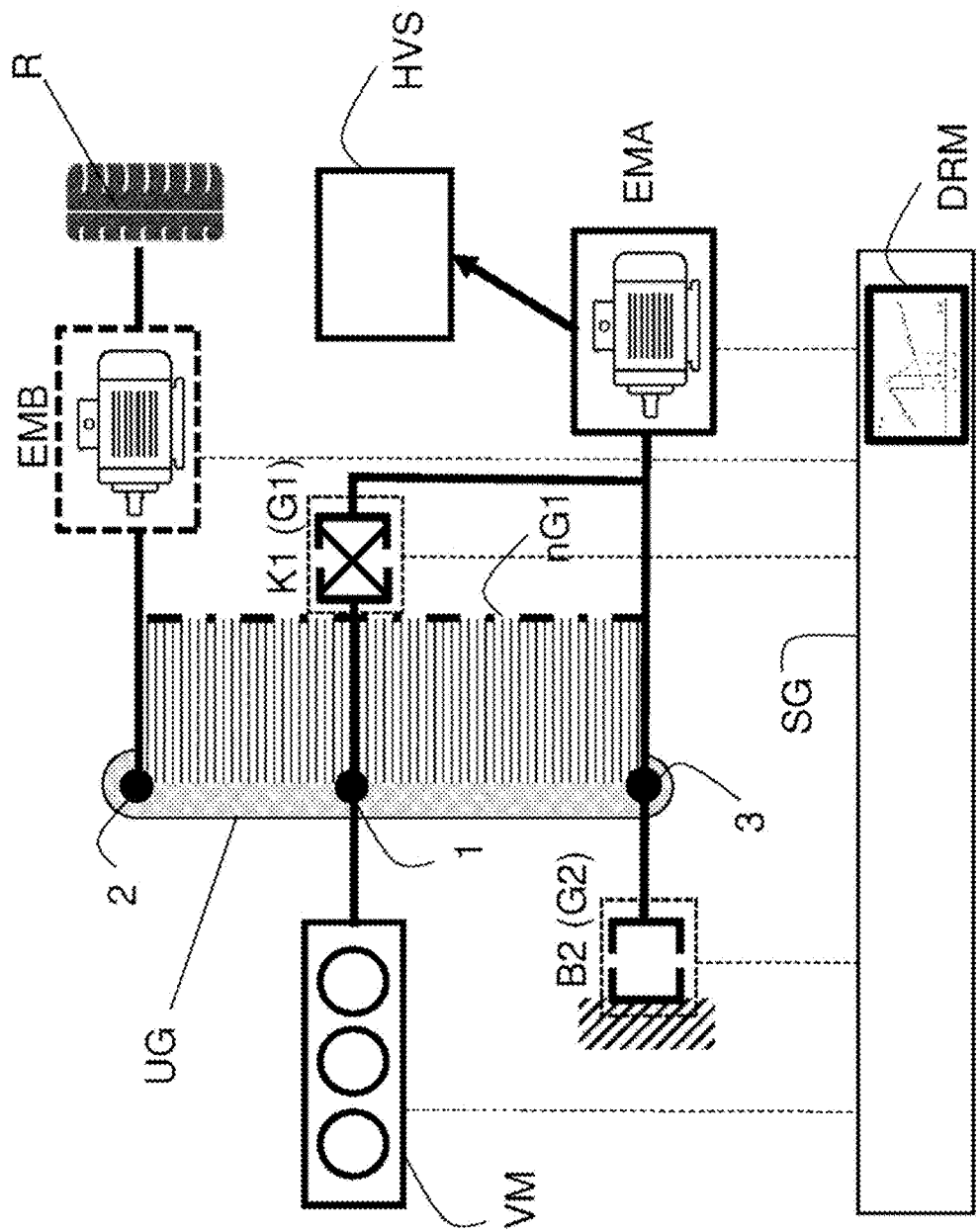
FIG. 2 schematically shows the essential components of a motor vehicle or transmission according to the invention and their states in state 1 of the entire shift sequence.

FIG. 2 shows the most important components of the invention, which also apply for FIGS. 4, 6, 8, 10 and 12:

FIG. 2 schematically shows a hybrid vehicle comprising an automatic transmission, an internal combustion engine VM, a first electric motor EMA, a second electric motor EMB, a high-voltage accumulator HVS and an electronic control unit SG.

The automatic transmission comprises an epicyclic gearbox UG in the form of a power-splitting planetary gearbox, a variator comprising the two electric motors EMA and EMB, and a first shift element K1 provided for engaging a first fixed gear ratio G1 (hereinafter also referred to as fixed gear G1) and a second shift element B2 provided for engaging a second fixed gear ratio G2.

The number of two gear ratios here is only for better illustration; in practice, a greater number of gear ratios can also be used.

Furthermore, the automatic transmission comprises two transmission shafts, namely an input shaft in the form of a drive shaft by means of which the automatic transmission is coupled to the internal combustion engine VM in a torque-transmitting manner, and an output shaft in the form of a driven shaft by means of which the automatic transmission is coupled to the wheels R of the motor vehicle in a torque-transmitting manner.

The automatic transmission can also have three or more fixed gear ratios, in which case it would also have a correspondingly larger number of shift elements provided for engaging further gear ratios. Individual shift elements can also be provided for a plurality of gear ratios and/or a combination of a plurality of shift elements for one gear ratio.

The planetary gearbox UG comprises the carrier 1, the ring gear 2 and the sun 3. The epicyclic gearbox UG is coupled to both the input shaft and the output shaft in a torque-transmitting manner. Furthermore, the epicyclic gearbox UG comprises a shaft via which it can be coupled to the input shaft in a torque-transmitting manner by means of the first shift element K1, which here forms a clutch, and can be coupled to the second shift element B2, which here forms a brake, in a torque-transmitting manner. The shaft has a speed-adjusting effect on the internal combustion engine VM. In an alternative embodiment, the shift elements K1, B2 can be provided for any torque-transmitting functions.

The shift elements K1, B2 are each formed as claw clutches. This means that they are interlocking shift elements and require only a small amount of pressure to be held in the closed position. In an alternative embodiment, the shift elements K1, B2 can be any other suitable shift elements, for example frictionally engaging shift elements.

The variator functionality for gear ratio adjustment is provided by operating the first electric motor EMA as a generator and the second electric motor EMB as a motor. This allows kinetic energy and electrical energy to be converted into one another and thus the speeds of the two electric motors EMA, EMB to be decoupled from one another.

Shifting the automatic transmission from a first gear ratio (fixed gear) G1 to a second fixed gear ratio (fixed gear) G2 is performed in accordance with the shift sequence illustrated with reference to FIGS. 3, 5, 7, 9, 11 and 13.

According to FIGS. 1 and 2, the first fixed gear ratio G1 is engaged, i.e., the first shift element K1 is closed and the second shift element B2 is open. Furthermore, the variator is decoupled; i.e., the electric motors are not coupled to either the input shaft or the output shaft in a torque-transmitting manner. All speeds nG1 are the same. The first electric motor EMA can be operated as a generator to charge the high-voltage accumulator HVS.

Figure 3:
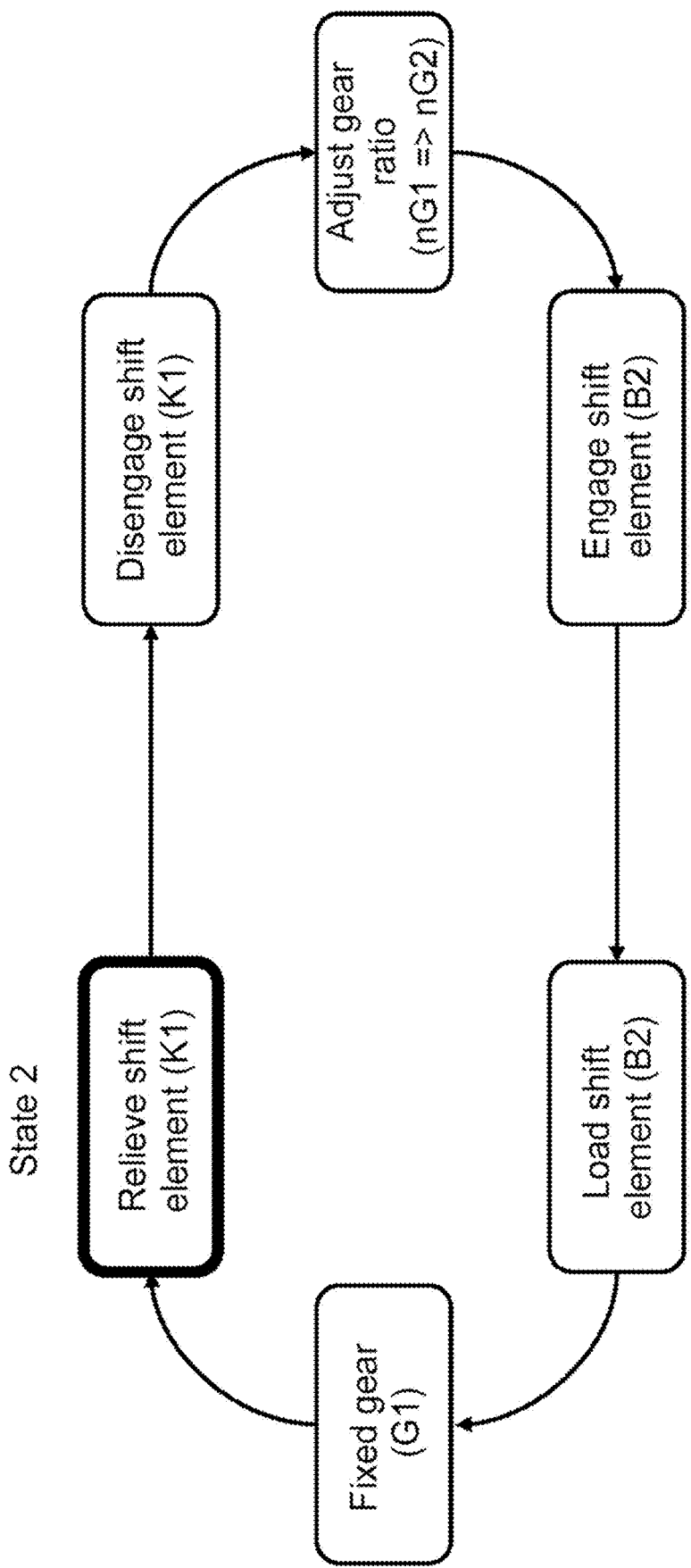
FIG. 3 shows state 2 of the entire shift sequence during a gear change with the automatic transmission according to the invention from a first fixed gear to a second fixed gear.

To shift to the second fixed gear ratio G2, the shift element K1 of the current (old) fixed gear G1 is now relieved, as shown in FIG. 3.

Figure 4:
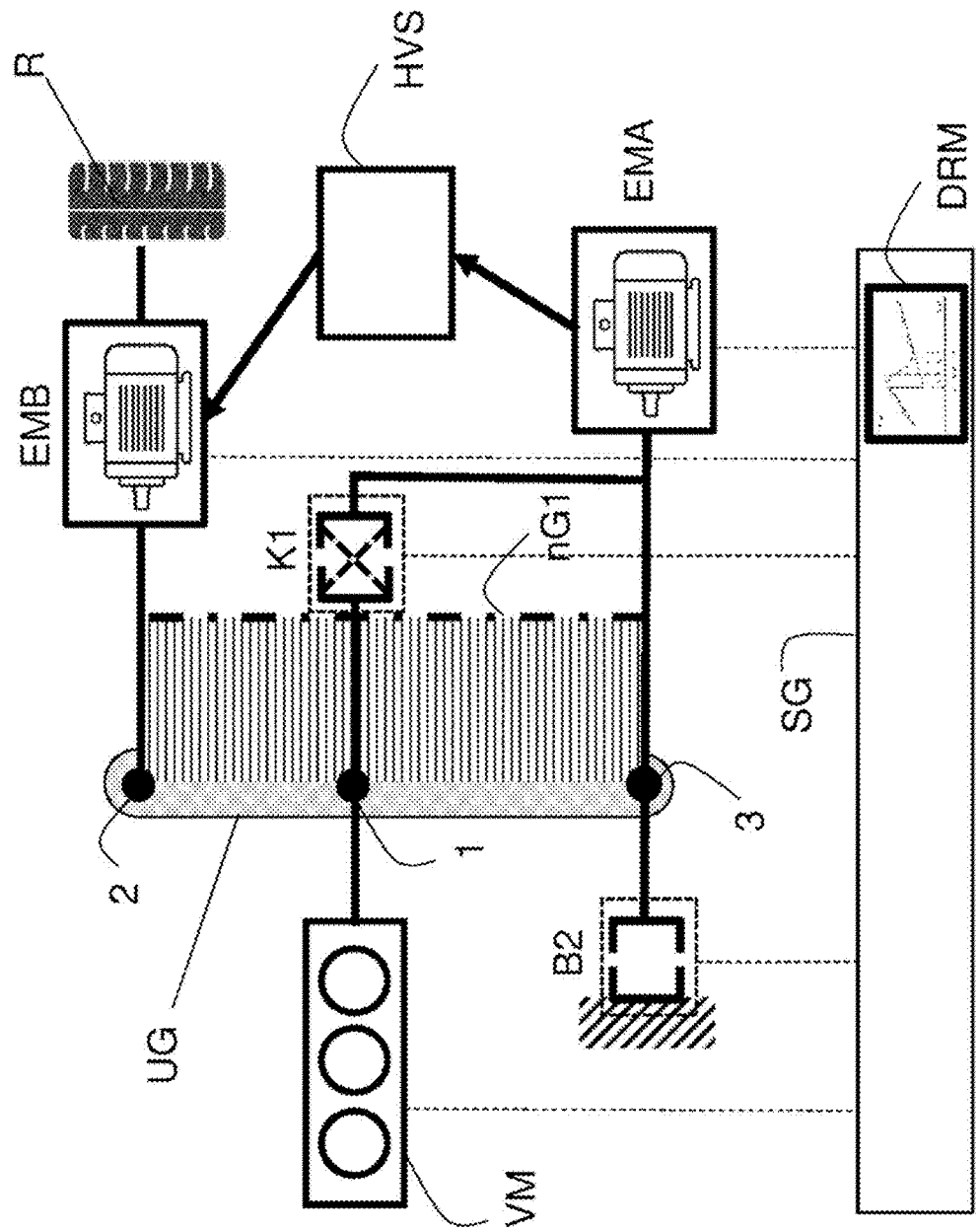
FIG. 4 schematically shows the essential components of a motor vehicle or transmission according to the invention and their states in state 2 of the entire shift sequence.

As can be seen in FIG. 4, the variator is coupled to the output shaft in a torque-transmitting manner and is also coupled to the epicyclic gearbox UG via the shaft in a torque-transmitting manner. In other words, the second electric motor EMB is motor-operated with the output or with the ring gear 2 or with the wheels R and is fed by the high-voltage accumulator HVS. The internal combustion engine VM can be switched off.

By means of the variator, the first shift element K1 is now relieved via the output shaft by a torque superposition (K1 shown dashed).

At this point, the core of the invention begins and will be explained again with reference to FIGS. 13 and 14.

Figure 5:
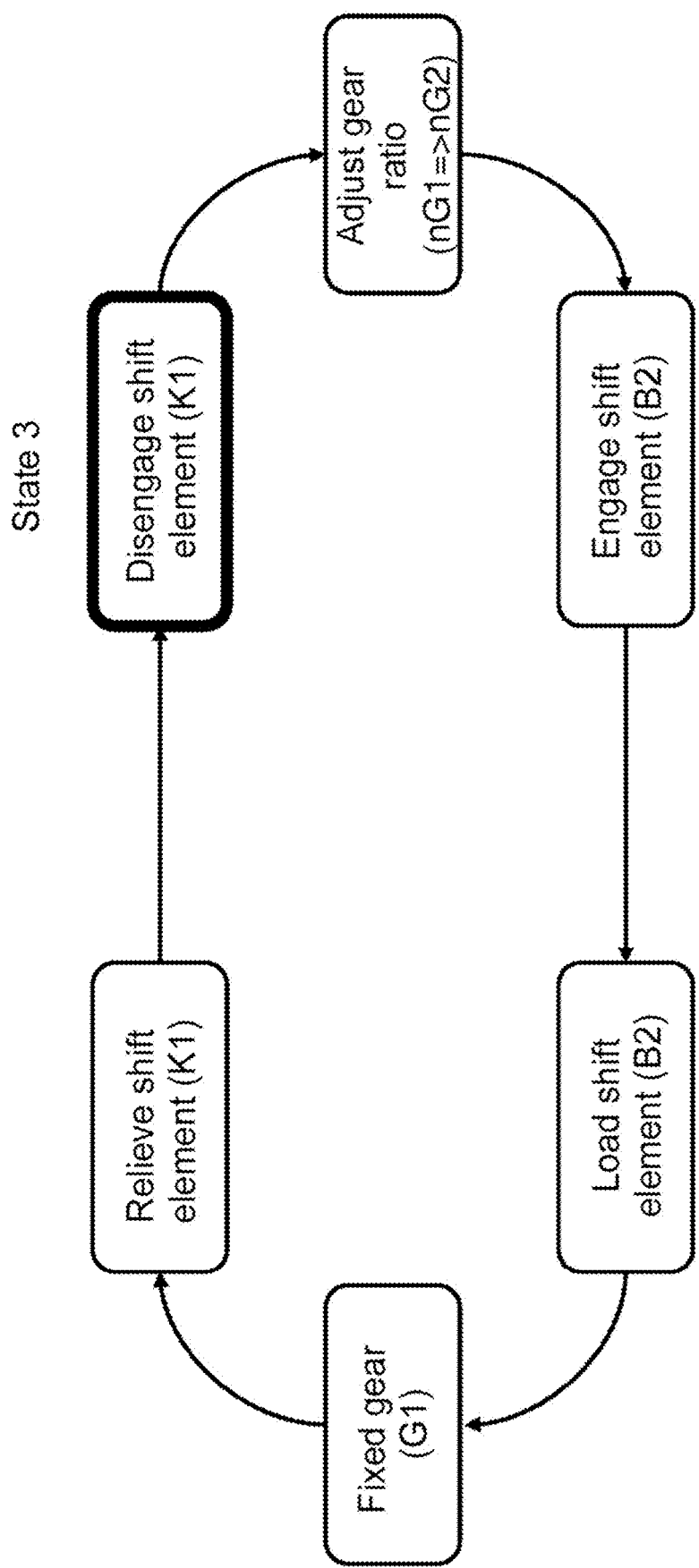
FIG. 5 shows state 3 of the entire shift sequence during a gear change with the automatic transmission according to the invention from a first fixed gear to a second fixed gear.
Figure 6:
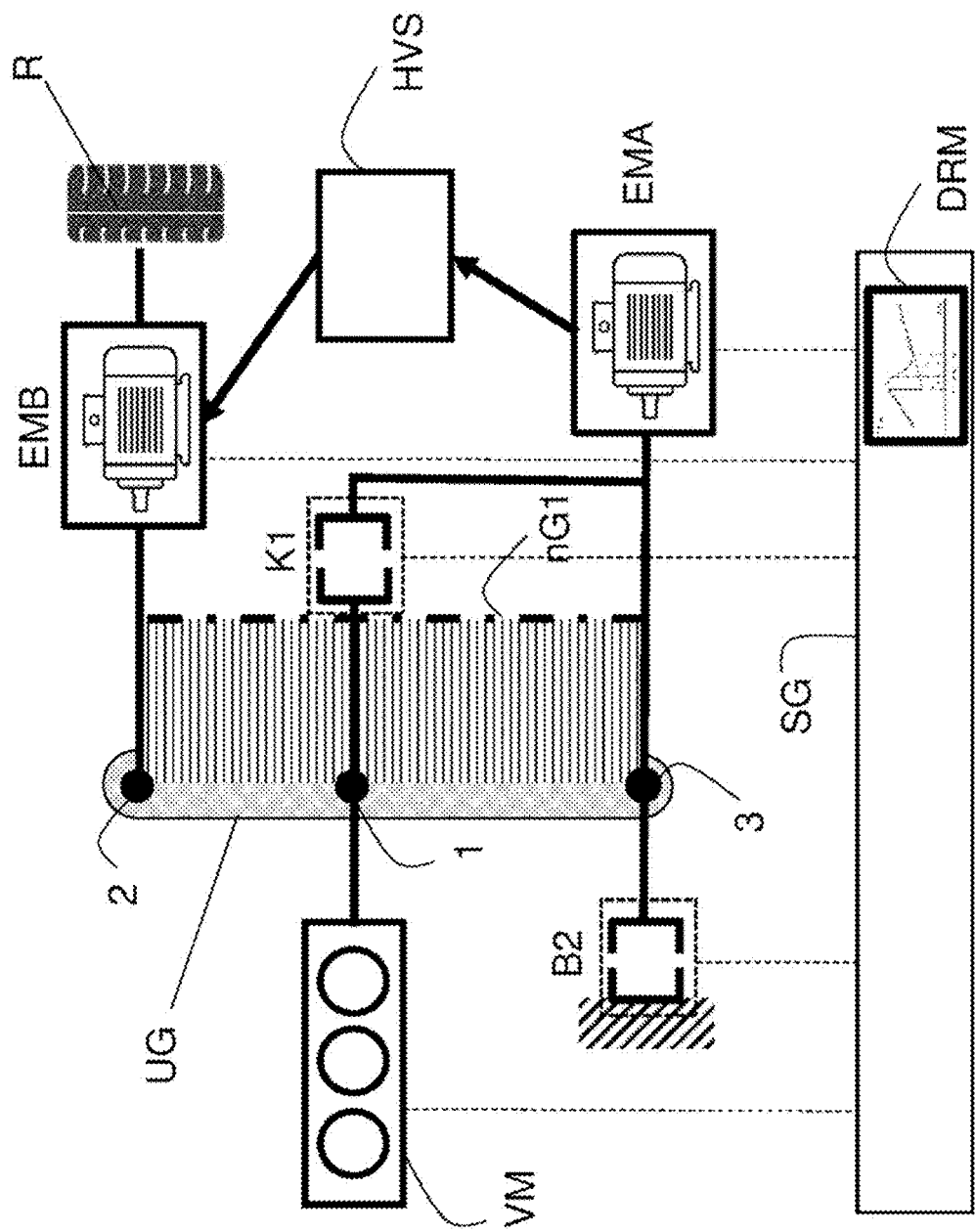
FIG. 6 schematically shows the main components of a motor vehicle or transmission according to the invention and their states in state 3 of the entire shift sequence.

According to state 3, which is shown activated in FIG. 5, the shift element K1 is then disengaged, as shown in FIG. 6 with K1 open.

Figure 7:
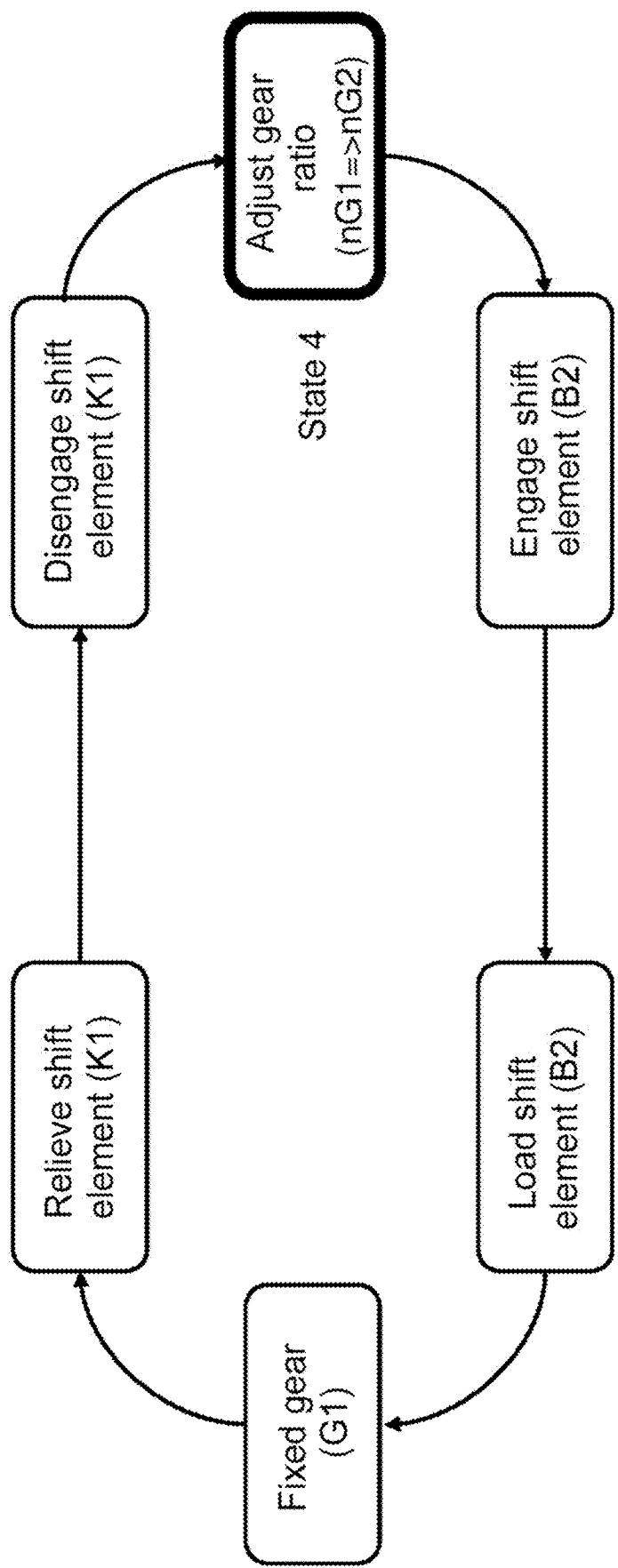
FIG. 7 shows state 4 of the entire shift sequence during a gear change with the automatic transmission according to the invention from a first fixed gear to a second fixed gear.
Figure 8:
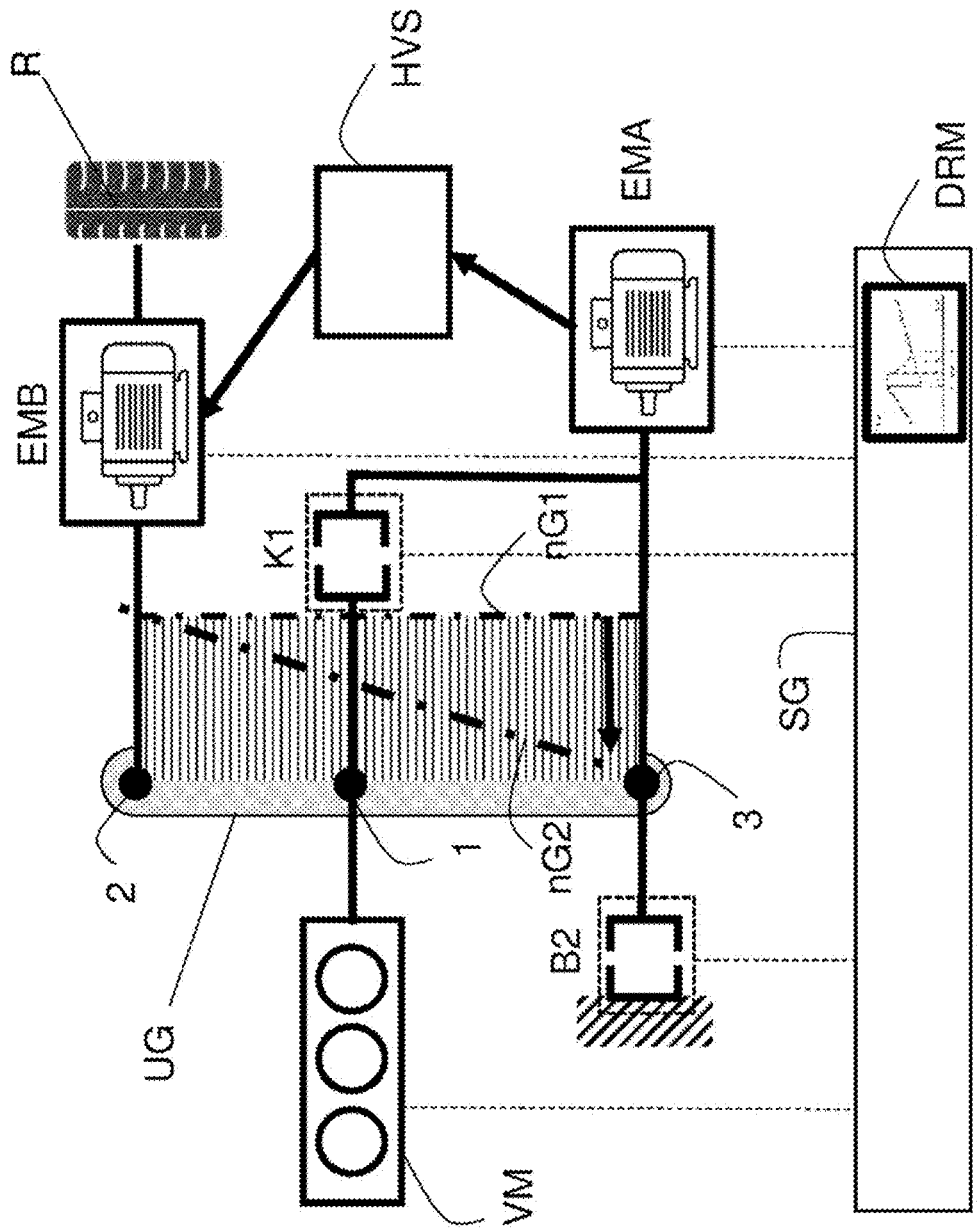
FIG. 8 schematically shows the essential components of a motor vehicle or transmission according to the invention and their states in state 4 of the entire shift sequence.

This is followed by state 4 according to FIG. 7, namely the preferably electrical and continuous gear ratio adjustment in a power-split gear ratio (E-CVT). This is illustrated in FIG. 8 by means of the speed shift at the sun 3. Accordingly, after the first shift element K1 is opened, the ratio of the second gear ratio (fixed gear) G2 is set by a continuous gear ratio adjustment of the variator or the electric motor EMA. The brake B2 is still open here.

This means that a 3-shaft operation is established, whereby the differential speed at the second shift element B2 is reduced.

Figure 9:
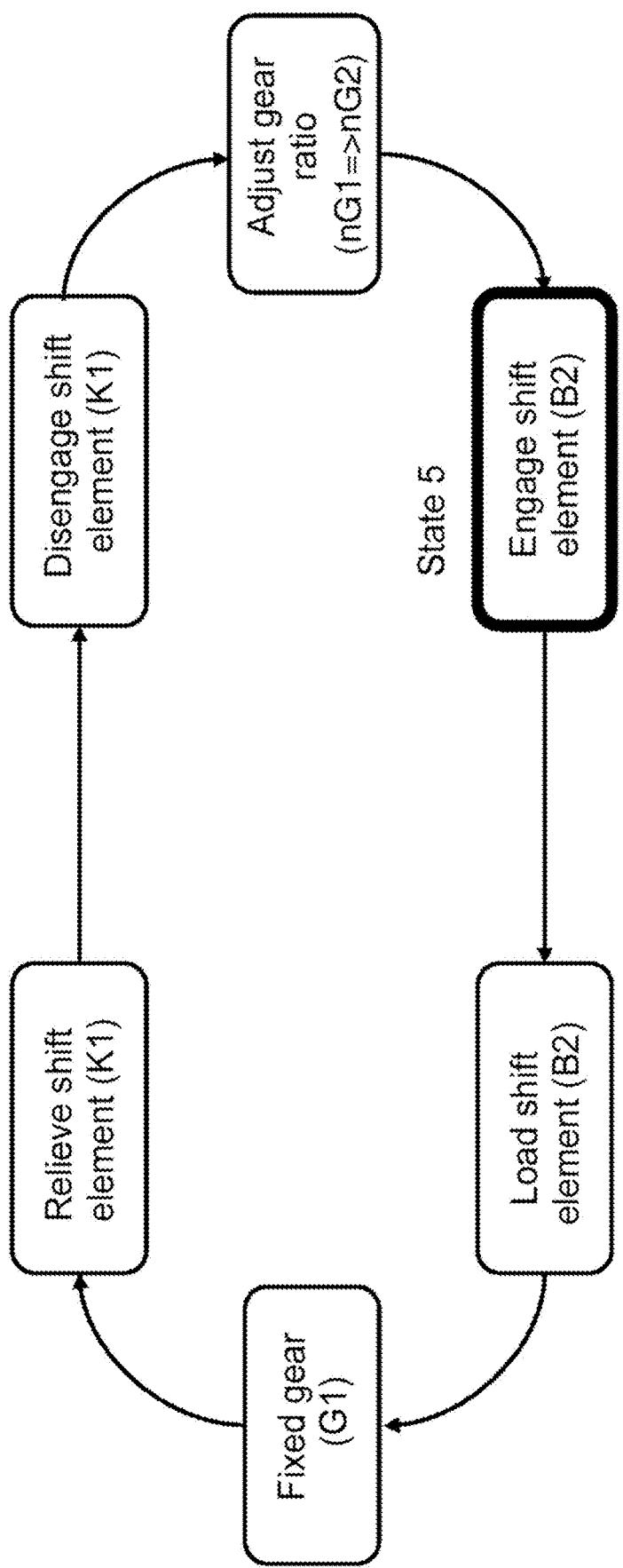
FIG. 9 shows state 5 of the entire shift sequence during a gear change with the automatic transmission according to the invention from a first fixed gear to a second fixed gear.

FIG. 9 shows the state 5 in which the shift element B2 is closed for the new fixed gear G2.

Figure 10:
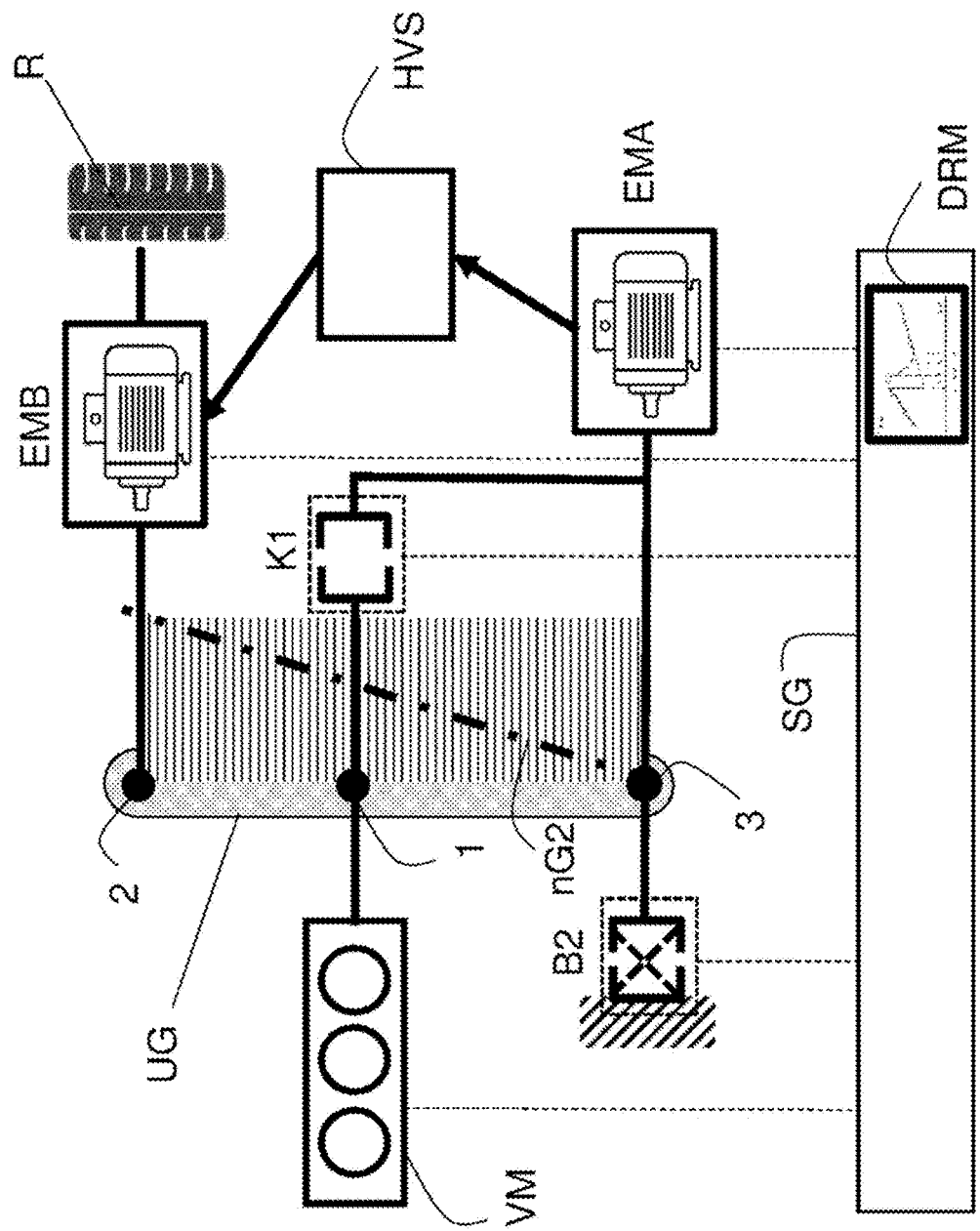
FIG. 10 schematically shows the essential components of a motor vehicle or transmission according to the invention and their states in state 5 of the entire shift sequence.

FIG. 10 shows here that the second shift element B2 is closed as soon as the differential speed has been reduced to zero or has fallen below a certain limit value. This causes the second shift element B2 to take over the load from the variator and the variator can be decoupled (see FIG. 10, dashed electric motor EMB). The brake B2 is not yet loaded (dashed B2).

Figure 11:
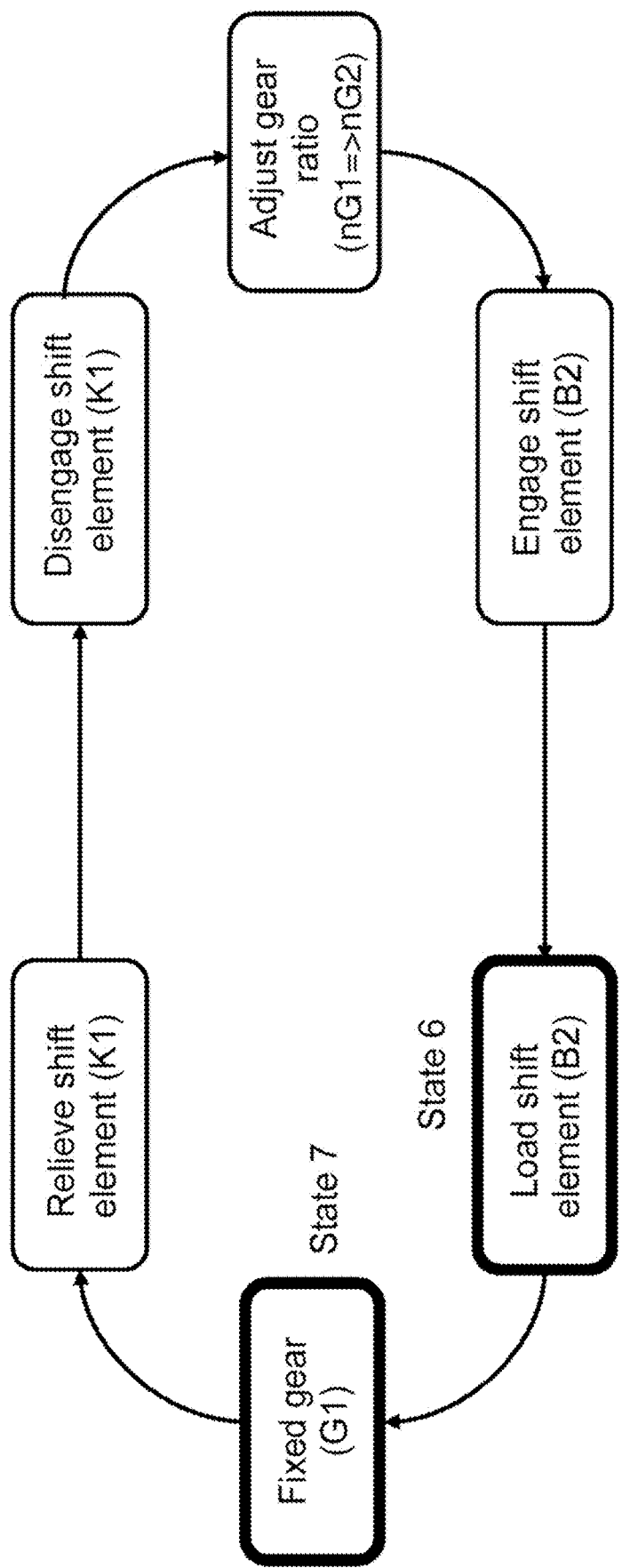
FIG. 11 shows states 6 and 7 of the entire shift sequence during a gear change with the automatic transmission according to the invention from a first fixed gear to a second fixed gear.
Figure 12:
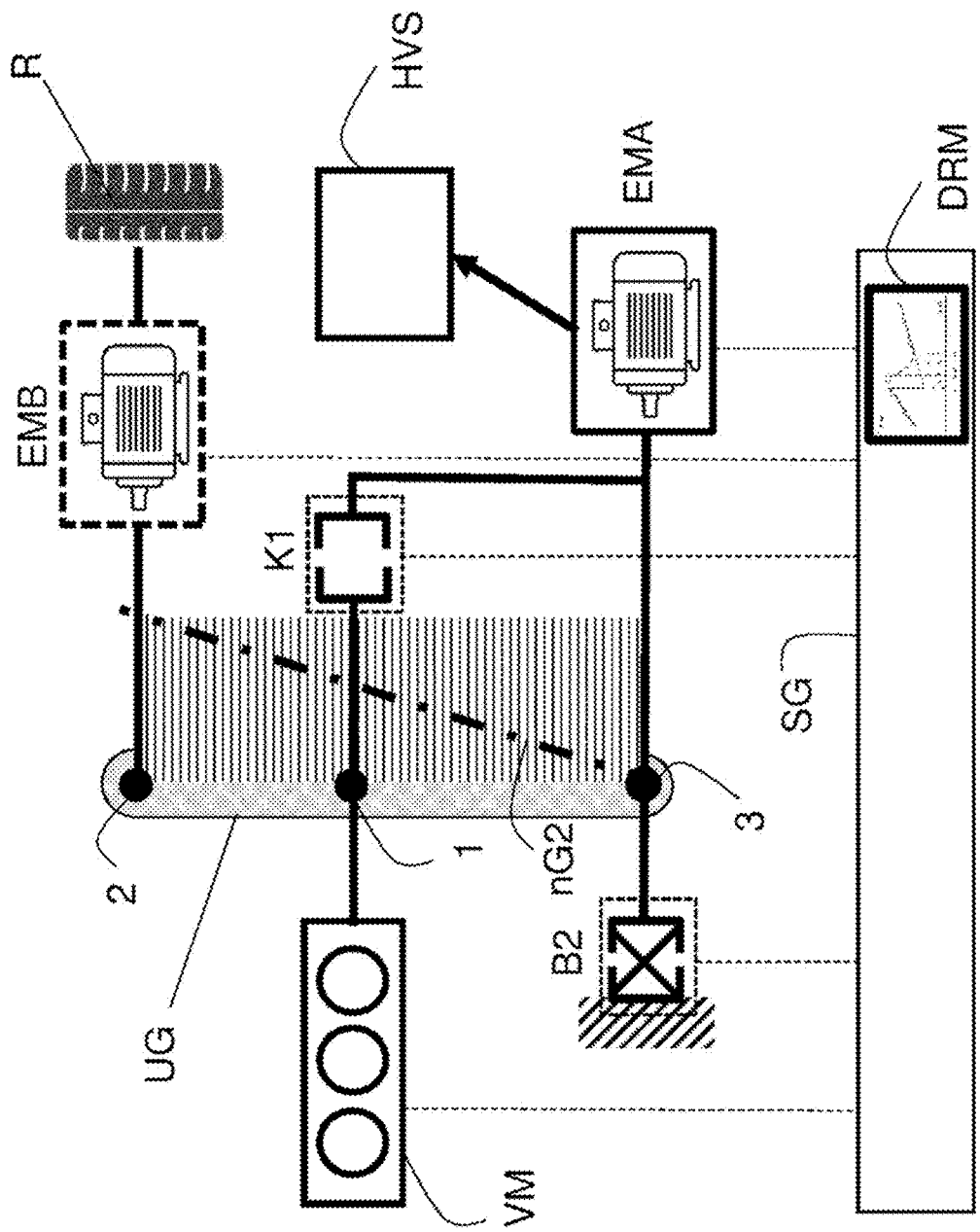
FIG. 12 schematically shows the essential components of a motor vehicle or transmission according to the invention and their states in states 6 and 7 of the entire shift sequence.

In FIG. 11, state 6 and directly associated with it state 7 or again 1 is reached, in which the new shift element B2 can be loaded (fully closed B2 in FIG. 12).

FIG. 12 concludes the switching sequence of a gear change (G1=>G2).

Summary of the entire shifting sequence with the intermediate state according to the invention starting from the current fixed gear (here G1):

Relieving of the old shift element K1 by the drive machines (state 2),
Opening of the old shift element K1 (state 3) (change to an E-CVT mode),
Speed adaptation for gear ratio adjustment (nG1=>nG2) in the transmission via the E-CVT mode (state 4) by activating the speed control module DRM according to the invention,
Engagement of the new shift element (B2) (state 5),
Loading of the new shift element (B2) (state 6),
"Dropping" of the E-motors EMA and EMB (state 7=state 1)=>new fixed gear G2.

Figure 13:
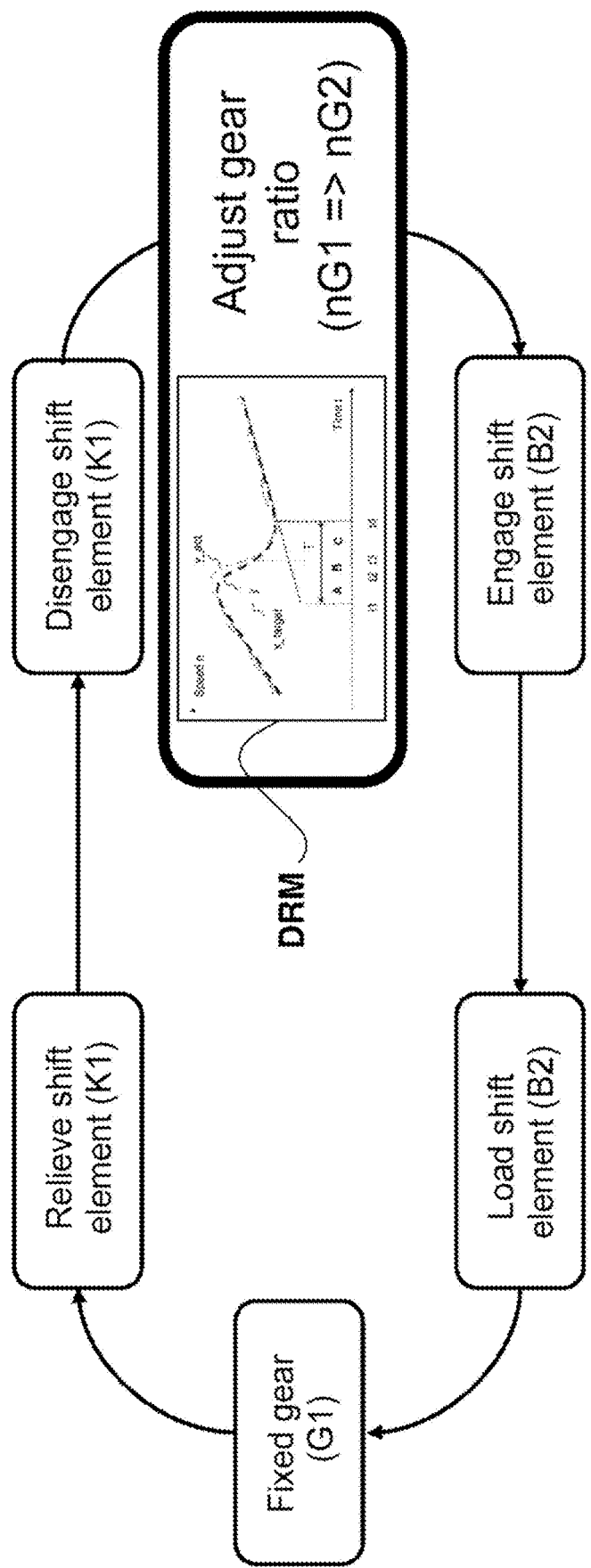
FIG. 13 shows the essential intermediate step according to the invention between states 3 and 5, i.e., a special procedural design of a state 4 (see also FIGS. 7 and 8), of the entire shift sequence during a gear change with the automatic transmission according to the invention from a first fixed gear to a second fixed gear.

FIG. 13 shows "state 4" according to the invention with the speed control module DRM.

Figure 14:
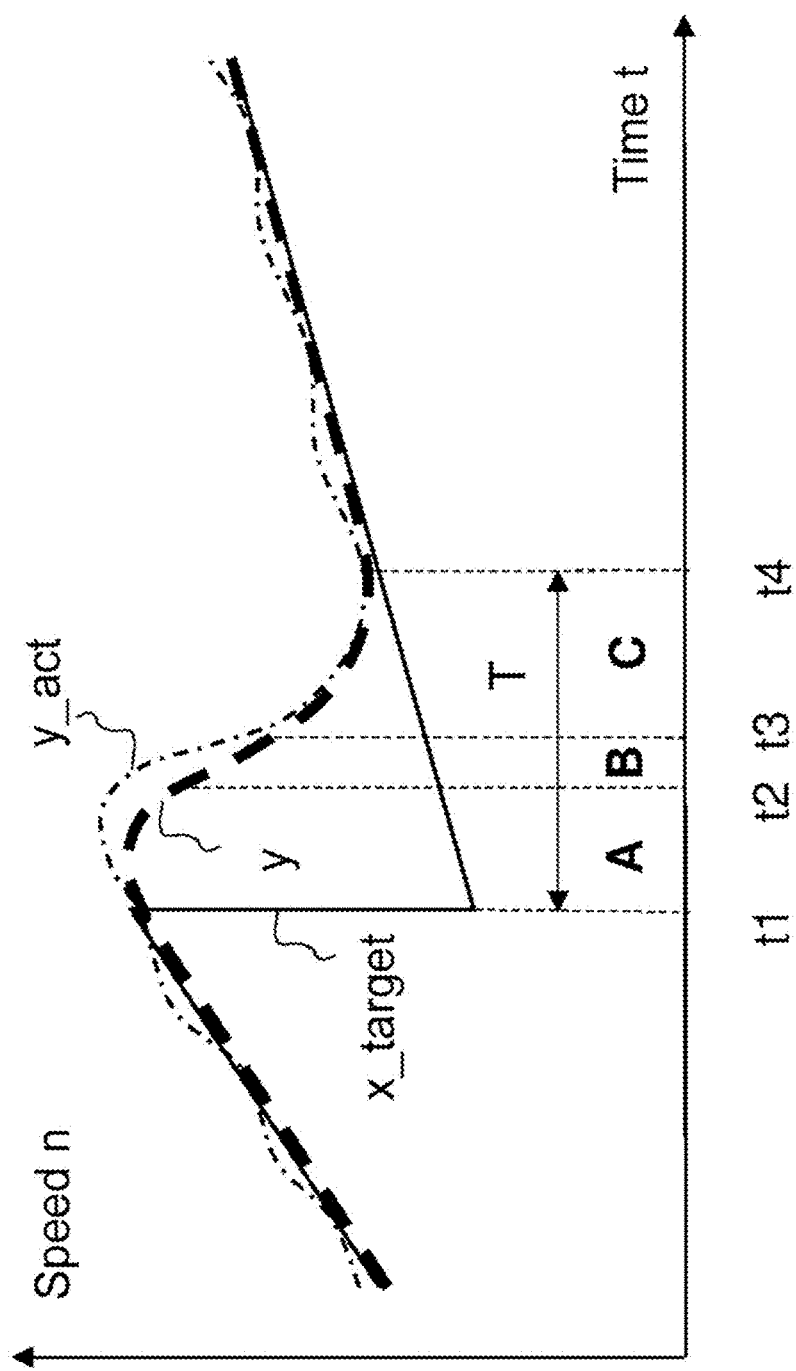
FIG. 14 schematically shows relevant speed curves for control by means of the speed control module (DRM) essential to the invention, shown in FIG. 13.

FIG. 14 shows three relevant curves of the speed n for an exemplary upshift (negative target speed jump x_target at time t1) with acceleration (increasing target speed x_target before and after t1). The following curves are shown:

solid line: target speed x_target
dashed line: setpoint speed y
dot-and-dash line: actual speed y_act For the control of the speed n, the time range T between the times t1 to t4 is considered. At time t1 the speed change phase of the upshift starts and at time t4 it is complete. At a time t2 the speed gradient is considered. At a time t3 the speed curvature is considered. Between the individual points in time there is a first partial consideration period A between t1 and t2, a second partial consideration period B between t2 and t3, and a third partial consideration period C between t3 and t4.

Figure 15:
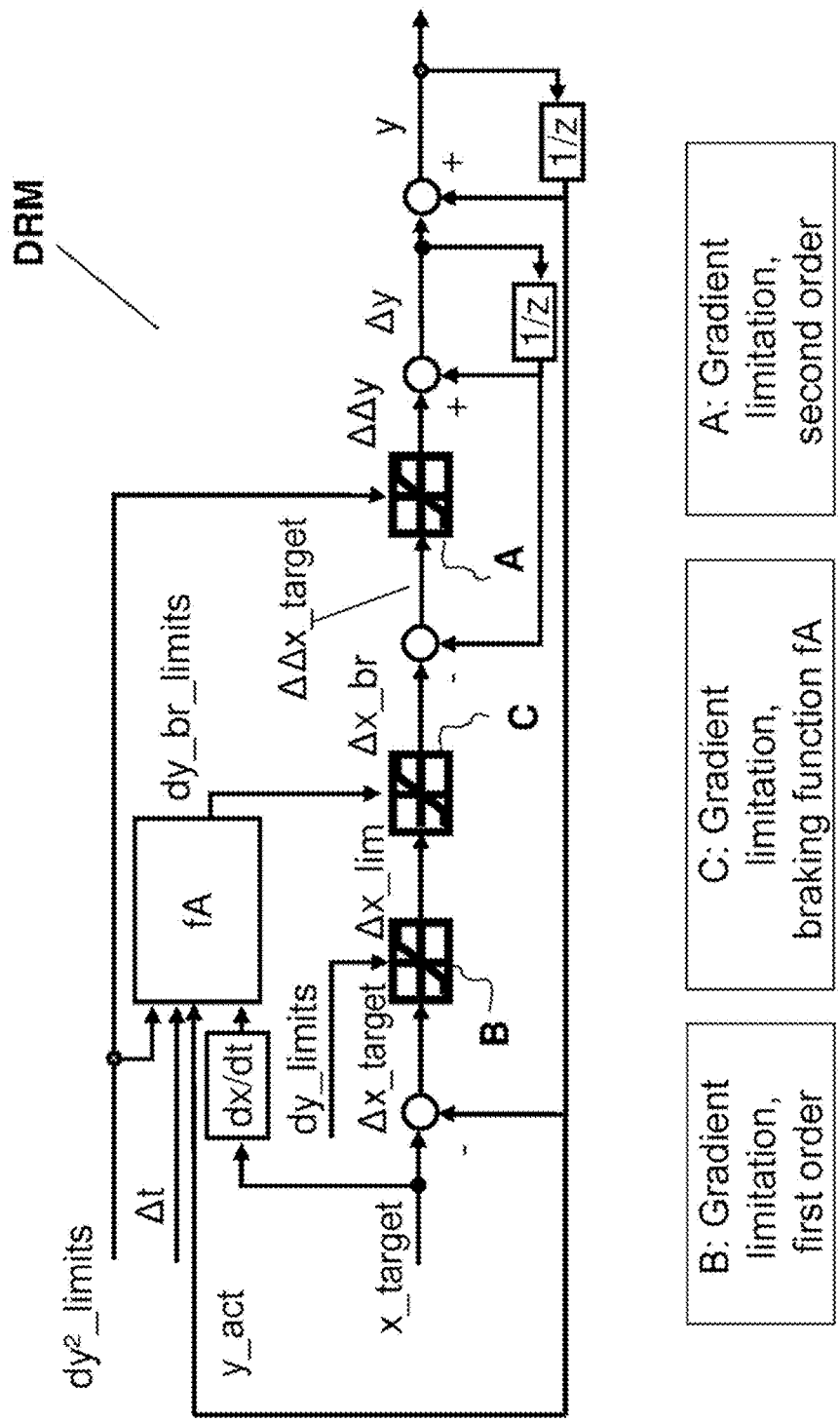
FIG. 15 schematically shows an exemplary embodiment of the speed control module (DRM) essential to the invention according to FIG. 13.

The functionality of the speed control module DRM according to the invention shown in FIG. 15 is used to determine the setpoint speed y on the basis of the target speed x_target and to calculate other required variables or parameters.

The following apply here:
x_target=target speed
Δt=sample time/step width
dy_limits=maximum allowed speed gradient (positive and negative)
$dy^2$_limits=maximum allowed speed curvature (positive and negative)
dy_br_limits=maximum allowed braking speed gradient (positive and negative)
dx/dt=derivation of a signal with respect to time (gradient formation)
1/z=signal feedback (value of the previous time step)
y=setpoint speed n
Δy=gradient of the setpoint speed (change of y within one time step Δt)
ΔΔy=curvature of the setpoint speed (change of Δy within one time step Δt)
y_act=actual speed n The target speed x_target changes abruptly at the time t1 due to the changed gear ratio of the fixed gear G2 to be newly engaged compared with that of the old fixed gear G1. In the event of such a shift, the speed controller usually has to realize a speed change of at least 300 rpm up to 2500 rpm or more. In order to reduce the variance of the operating point of the speed controller, according to the invention a continuous signal, the setpoint speed y, over the time range T is generated by a first-order gradient limitation in the partial consideration period B, by a second-order gradient limitation in the partial consideration period A, and by a braking function fA with gradient limitation in the partial consideration period C.

The speed gradient of the setpoint speed y of the internal combustion engine VM, for example, which can be converted into the required total change in the internal combustion engine torque on the basis of acting mass moments of inertia and vice versa, is thus limited in advance to the operating range of the internal combustion engine (dy_limits).

The maximum permissible curvature $dy^2$_limits of the setpoint speed y of the internal combustion engine VM can be converted into the required torque gradient of the internal combustion engine VM similarly to the calculation of the speed gradient of the setpoint speed y, and vice versa. Therefore, the curvature ΔΔY of the speed n over time that can be represented by the internal combustion engine VM can also be calculated in advance and included in the curve of the setpoint speed y.

The actual speed y_act of the internal combustion engine VM represents an exemplary curve which can be adjusted on the basis of a suitable controller in conjunction with feedforward control via the setpoint speed y and its time derivative.

The braking function fA determines the setpoint speed change dy_br_limits allowed for the current time step using the information on the maximum allowed speed curvature $dy^2$_limits, the current step size, the setpoint speed of the previous calculation step, and the current gradient of the target speed.

In other words, the first-order gradient limitation in the partial consideration period B is such that the maximum torque gradients that can be set by the drive motors VM and EMA and/or EMB are not exceeded; i.e., for example: y'=dy/dt=MIN ((M_VM, M_EMA)/J) (MIN=minimum selection; J=moment of inertia). The second-order gradient limitation in the partial consideration period A is such that the maximum torque gradients which can be set by the drive motors VM and EMA and/or EMB are not exceeded; i.e., for example: y"=MIN ((dM_VM/dt, dM_EMA/dt)/J). The time range T is determined by the braking function fA.

The following relationship applies for the braking function fA:

$$dy_{br_{limit}} = \frac{dx_{target}}{dt} - dy_{limit}^2 * \sqrt{\left|\frac{2*(x_{target}-y)}{dy_{limit}^2}\right|}$$

In the root term, the currently expected braking time (t–t4) is determined on the basis of the difference between target and setpoint speed, as well as the representable speed curvature.

Based on the braking time and the maximum allowed speed curvature $dy^2$_limits, the currently allowed speed gradient of the setpoint speed is in turn calculated.

The overall function shown arranges the braking function fA directly after the first-order gradient limitation; the second-order gradient limitation is in third place. This arrangement has the advantage that the setpoint speed y observes the required limits for speed gradients and speed curvature under all circumstances.

In one variant of the overall function, the braking function can be arranged in the third position for limiting the gradient of the setpoint speed. However, this variant bears the risk that the limit values of the setpoint speed in gradient and curvature cannot be observed under all circumstances.

Depending on the magnitude of the speed jump of x_target, it can lead to the fact that the partial consideration period B must be skipped, i.e., the maximum speed gradient is not reached, and it is necessary to jump directly from the partial consideration period A into the partial consideration period C.

The invention claimed is:

1. A motor vehicle, comprising:
   at least two drive motors, wherein at least one drive motor is an electric motor;
   a high-voltage accumulator;
   an automatic transmission which has at least one fixed gear ratio (G1) and at least one power-split gear ratio (E-CVT) for gear ratio adjustment starting from the at least one fixed gear ratio (G1); and
   an electronic control unit (SG) which contains a speed control module (DRM) which is activatable during a ratio change and is configured such that a setpoint speed (y) is calculated in advance, by which both a speed gradient (Δy) and a speed curvature (ΔΔy) can be limited, wherein
   a target speed (x_target) of the at least one drive motor is continuously compared with a maximum allowed speed gradient (dy_limits) and with a maximum allowed speed curvature ($dy^2$_limits).

2. The motor vehicle according to claim 1, wherein
   limitation of the speed gradient (Δy) and the speed curvature (ΔΔy) is extended by a braking function (fA), wherein the speed control module continuously determines how much speed gradient (dy_br_limits) is still allowed in order to hit a target speed curve (x) exactly tangentially with the setpoint speed (y) while maintaining a currently allowed speed curvature ($dy^2$ limits) and at a currently available rate of change (dx/dt) of the target speed (x_target).

3. The motor vehicle according to claim 2, wherein
   in the speed control module (DRM), a gradient limitation (C) of the braking function (fA) directly adjoins a first-order gradient limitation (B), and a second-order gradient limitation (A) adjoins the gradient limitation (C).

4. The motor vehicle according to claim 2, wherein
   in the speed control module (DRM), the gradient limitation (C) of the braking function (fA) directly adjoins the second-order gradient limitation (A), and the second-order gradient limitation (A) adjoins a first-order gradient limitation (B).

5. An automatic transmission for a motor vehicle comprising:
   an epicyclic gearbox (UG);
   at least one shift element (K1 and/or B2);
   at least one electric motor as a drive motor which is part of a variator; and
   an electronic control unit, wherein the electronic control unit contains a speed control module (DRM) which is activatable during a speed change and is configured such that a setpoint speed (y) is calculated in advance, by which both a speed gradient (Δy) and a speed curvature (ΔΔy) can be limited, wherein a target speed (x_target) of the drive motor is continuously compared with a maximum allowed speed gradient (dy_limits) and with a maximum allowed speed curvature ($dy^2$_limits).

6. An electronic control unit for a motor vehicle, the motor vehicle having:
   at least two drive motors, wherein at least one drive motor is an electric motor;
   a high-voltage accumulator; and
   an automatic transmission which has at least one fixed gear ratio (G1) and at least one power-split gear ratio (E-CVT) for gear ratio adjustment starting from the at least one fixed gear ratio (G1), as well as shift elements (K1, B2);
   the electronic control unit comprising:
   a speed control module (DRM) for controlling the at least two drive motors (VM, EMA, EMB) and the shift elements (K1, B2) such that a setpoint speed (y) is calculated in advance, by which both a speed gradient (Δy) and a speed curvature (ΔΔy) can be limited,
   wherein the target speed (x_target) of at least one drive motor (VM, EMA, EMB) is continuously compared with a maximum allowed speed gradient (dy_limits) and with a maximum allowed speed curvature ($dy^2$_limits).

7. A method for shifting an automatic transmission in a motor vehicle, having:
   at least two drive motors, wherein at least one drive motor is an electric motor;
   a high-voltage accumulator;
   an automatic transmission which has at least one fixed gear ratio (G1) and at least one power-split gear ratio (E-CVT) for gear ratio adjustment starting from the at least one fixed gear ratio (G1); and
   an electronic control unit (SG) which contains a speed control module (DRM) which is activatable during a ratio change,
   the method comprising:
   after a gear shift command is present, calculating, via the electronic control unit, in advance a setpoint speed (y), by which both a speed gradient (Δy) and a speed curvature (ΔΔy) can be limited,
   wherein a target speed (x_target) of the at least one drive motor (VM, EMA, EMB) is continuously compared with a maximum allowed speed gradient (dy_limits) and with a maximum allowed speed curvature ($dy^2$_limits).

\* \* \* \* \*